(12) United States Patent
Shu et al.

(10) Patent No.: US 10,517,121 B2
(45) Date of Patent: Dec. 24, 2019

(54) SERVICE PROCESSING METHOD, RELATED APPARATUS, AND SYSTEM

(71) Applicant: Huawei Technologies Co., Ltd., Shenzhen (CN)

(72) Inventors: Lin Shu, Shanghai (CN); Xiaoji Sun, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 42 days.

(21) Appl. No.: 15/702,309

(22) Filed: Sep. 12, 2017

(65) Prior Publication Data
US 2018/0007720 A1    Jan. 4, 2018

Related U.S. Application Data
(63) Continuation of application No. PCT/CN2015/074218, filed on Mar. 13, 2015.

(51) Int. Cl.
*H04W 76/10* (2018.01)
*H04W 48/00* (2009.01)
(Continued)

(52) U.S. Cl.
CPC ....... *H04W 76/10* (2018.02); *H04W 28/0289* (2013.01); *H04W 48/00* (2013.01); *H04W 48/06* (2013.01); *H04W 4/14* (2013.01)

(58) Field of Classification Search
None
See application file for complete search history.

(56) References Cited

U.S. PATENT DOCUMENTS

| 9,544,709 B2 * | 1/2017 | Jain .................... H04W 4/70 |
| 2007/0041343 A1 * | 2/2007 | Barreto ................ H04W 76/10 |
| | | 370/329 |

(Continued)

FOREIGN PATENT DOCUMENTS

| CN | 101009944 A | 8/2007 |
| CN | 102362513 A | 2/2012 |

(Continued)

OTHER PUBLICATIONS

"3rd Generation Partnership Project; Technical Specification Group Core Network and Terminals; IMS multimedia telephony communication service and supplementary services; Stage 3 (Release 12)," 3GPP TS 24.173, V12.3.0, pp. 1-18, 3rd Generation Partnership Project, Valbonne, France (Dec. 2014).

(Continued)

*Primary Examiner* — Bunjob Jaroenchonwanit
(74) *Attorney, Agent, or Firm* — Leydig, Voit & Mayer, Ltd.

(57) ABSTRACT

Embodiments of the present invention provide a service processing method, a related apparatus, and a system. The method includes: UE adds a service type indication of a service initiated by the UE to an RRC connection request and sends the RRC connection request to a base station, and adds the service type indication of the service initiated by the UE to a non-access stratum NAS request and sends the NAS request to a mobility management network element. In this way, when a network side performs congestion control or overload control, the base station may determine, according to the service type indication, that the service initiated by the UE is a voice service, a video service, or a short message service, accept the RRC connection request. Similarly, the mobility management network element may accept, according to the service type indication, the NAS request.

9 Claims, 10 Drawing Sheets

(51) Int. Cl.
*H04W 28/02* (2009.01)
*H04W 48/06* (2009.01)
*H04W 4/14* (2009.01)

(56) References Cited

U.S. PATENT DOCUMENTS

| | | | | |
|---|---|---|---|---|
| 2010/0304752 | A1* | 12/2010 | Kitahara | H04W 76/18 455/450 |
| 2011/0019633 | A1 | 1/2011 | Tajima et al. | |
| 2011/0028120 | A1* | 2/2011 | Wu | H04W 36/0022 455/404.1 |
| 2011/0096669 | A1* | 4/2011 | Iovieno | H04L 63/306 370/241 |
| 2012/0054809 | A1* | 3/2012 | Chowdhury | H04N 21/2223 725/93 |
| 2012/0163265 | A1 | 6/2012 | Kotecha et al. | |
| 2012/0224500 | A1* | 9/2012 | Shinohara | H04W 84/047 370/252 |
| 2013/0083726 | A1* | 4/2013 | Jain | H04W 4/70 370/328 |
| 2013/0223247 | A1 | 8/2013 | Bae et al. | |
| 2013/0288693 | A1* | 10/2013 | Dai | H04W 72/04 455/450 |
| 2013/0304956 | A1 | 11/2013 | Barclay et al. | |
| 2014/0016614 | A1* | 1/2014 | Velev | H04W 4/70 370/331 |
| 2014/0105010 | A1* | 4/2014 | Fang | H04W 28/0215 370/230 |
| 2014/0146759 | A1 | 5/2014 | Cho et al. | |
| 2014/0192772 | A1* | 7/2014 | Somasundaram | H04W 36/0022 370/331 |
| 2014/0235284 | A1 | 8/2014 | Chen et al. | |
| 2014/0254523 | A1* | 9/2014 | Chai | H04W 72/04 370/329 |
| 2015/0024795 | A1* | 1/2015 | Brend | H04W 48/12 455/466 |
| 2015/0071249 | A1* | 3/2015 | Hu | H04W 36/0022 370/331 |
| 2015/0098448 | A1* | 4/2015 | Xu | H04W 24/10 370/331 |
| 2016/0073299 | A1* | 3/2016 | Liang | H04W 36/0022 370/331 |
| 2016/0095034 | A1* | 3/2016 | Hampel | H04W 36/14 370/331 |
| 2016/0150458 | A1* | 5/2016 | Wang | H04W 36/0072 370/331 |
| 2016/0157290 | A1* | 6/2016 | Lee | H04W 48/18 370/329 |
| 2016/0227469 | A1* | 8/2016 | Kim | H04W 4/14 |
| 2016/0278096 | A1* | 9/2016 | Watfa | H04W 28/0205 |
| 2016/0338031 | A1* | 11/2016 | Wang | H04L 67/2842 |
| 2017/0086186 | A1* | 3/2017 | Shuai | H04W 72/048 |
| 2017/0142706 | A1* | 5/2017 | Kim | H04W 48/14 |
| 2017/0181064 | A1* | 6/2017 | Lee | H04W 76/14 |
| 2017/0359706 | A1* | 12/2017 | Pinheiro | H04W 4/14 |
| 2018/0027479 | A1* | 1/2018 | Ahmad | H04W 48/06 370/235 |
| 2018/0049209 | A1* | 2/2018 | Hu | H04W 48/18 |

FOREIGN PATENT DOCUMENTS

| | | |
|---|---|---|
| CN | 102438292 A | 5/2012 |
| CN | 102469551 A | 5/2012 |
| CN | 103475458 A | 12/2013 |
| CN | 103857005 A | 6/2014 |
| CN | 104054377 B | 11/2018 |
| EP | 2568728 A2 | 3/2013 |
| EP | 2624656 A1 | 8/2013 |
| EP | 3122145 A1 | 1/2017 |
| RU | 2476001 C2 | 2/2013 |

OTHER PUBLICATIONS

"3rd Generation Partnership Project; Technical Specification Group Core Network and Terminals; Support of SMS over IP networks; Stage 3 (Release 12)," 3GPP TS 24.341, V12.6.0, pp. 1-53, 3rd Generation Partnership Project, Valbonne, France (Dec. 2014).

"3rd Generation Partnership Project; Technical Specification Group Radio Access Network; Evolved Universal Terrestrial Radio Access Network (E-UTRAN); Study on smart congestion mitigation (Release 12)," 3GPP TR 36.848 V12.0.0, 3rd Generation Partnership Project, Valbonne, France (Mar. 2014).

"Discussion on ACB skip mechanism for IMS services and SMS", 3GPP TSG CT WG1 Meeting #86bis C1-141077, 3rd Generation Partnership Project, Valbonne, France (Mar. 31-Apr. 4, 2014).

"On prioritizing MMTEL-voice/video in IDLE," 3GPP TSG RAN WG2 #85 R2-140414, 3rd Generation Partnership Project, Valbonne, France (2014).

* cited by examiner

SERVICE PROCESSING METHOD, RELATED APPARATUS, AND SYSTEM

CROSS-REFERENCE TO RELATED APPLICATIONS

This application is a continuation of International Application No. PCT/CN2015/074218, filed on Mar. 13, 2015, the disclosure of which is hereby incorporated by reference in its entirety.

TECHNICAL FIELD

The embodiments of the present invention relate to the communications field, and in particular, to a service processing method, a related apparatus, and a system.

BACKGROUND

For instant messaging services, such as a voice service, a video service, and a short message service, an IP multimedia subsystem (IMS) can provide a user with high-quality IMS services that are based on a voice, a video, a short message service message, and the like. A service, such as a voice service, a video service, or a short message service, may be provided by using a user plane of an evolved packet system (EPS) network. For sending of user plane data, user equipment needs to first establish a radio resource control (RRC) connection to a network side, to change a status of the user equipment into a connection state. Establishment of the radio resource control connection includes initiating an access stratum (AS) signaling connection to an access network and initiating a non-access stratum (NAS) signaling connection to a core network.

Before establishing the RRC connection, the user equipment needs to determine, according to an access class barring (ACB) mechanism, whether there is access barring, so as to avoid excessively heavy cell load. According to a configuration policy of an operator, ACB may be skipped by broadcasting a service, such as a voice service, a video service, or a short message service, in an air interface system message by using the access network. In this way, after the user equipment reads and stores the system message, if a user initiates a service, such as a voice service, a video service, or a short message service, access control of current ACB may be skipped, to initiate a connection setup request to the access network for the service, such as a voice service, a video service, or a short message service. Specifically, an IMS layer of the user equipment notifies a type of a service initiated by the IMS layer to a NAS layer and an AS layer of the user equipment, and the AS layer determines, according to the type of the service initiated by the IMS layer, whether to skip access barring of the ACB.

In the foregoing technology, a final decision point of the ACB mechanism is at the AS layer of the user equipment. If the AS layer skips the ACB to initiate a signaling connection setup request, an access network side accepts the setup request. Based on this rule, the IMS layer of the user equipment needs to notify the type of the initiated service only to the NAS layer and the AS layer of the user equipment, to perform preferential access processing on the service, such as a voice service, a video service, or a short message service, on a user equipment side. However, from a perspective of the access network and the core network, when a signaling connection is being established, if the access network performs congestion control or overload control, the access network rejects a signaling connection request initiated by the user equipment, to relieve signaling load on the network side, that is, the network side rejects the signaling connection setup request when performing congestion control or overload control. Consequently, a service, such as a voice service, a video service, or a short message service, fails to be established.

SUMMARY

Embodiments of the present invention provide a service processing method, a related apparatus, and a system, so as to resolve a prior-art problem that a service, such as a voice service, a video service, or a short message service initiated by user equipment UE fails to be established because a network side performs congestion control or overload control.

To achieve the foregoing objective, the following technical solutions are used in the embodiments of the present invention:

According to a first aspect, a base station is provided, including:

a receiving unit, configured to receive, in a process of performing congestion control or overload control, a radio resource control RRC connection request sent by user equipment UE, where the RRC connection request includes a service type indication of a service initiated by the UE, and the service type indication is used to indicate any one of a voice service, a video service, or a short message service;

a determining unit, configured to determine, according to the service type indication, to establish an RRC connection for the UE; and a sending unit, configured to send an RRC connection setup message to the UE.

With reference to the first aspect, in a first possible implementation of the first aspect, the sending unit is further configured to send a connection setup request to a mobility management network element, and the connection setup request includes the service type indication, so that in a process of performing the congestion control or the overload control, if the mobility management network element receives a non-access stratum NAS request message that is sent by the UE and that includes the service type indication, the mobility management network element determines to send an accept message corresponding to the NAS request message to the UE; where the connection setup request is any one of an initial UE message, an uplink non-access stratum NAS transport message, or a direct transfer message.

With reference to the first aspect, in a second possible implementation of the first aspect, the base station further includes a statistics collection unit, configured to perform, according to the service type indication, statistics collection and classification on types of services initiated by the UE.

With reference to the first aspect, in a third possible implementation of the first aspect, the sending unit is further configured to: when the service that is initiated by the UE and that is corresponding to the service type indication is handed over, send the service type indication and an identifier of the UE to a target base station to which the service is handed over.

According to a second aspect, a mobility management network element is provided, including:

a receiving unit, configured to receive a connection setup request sent by a base station, where the connection setup request includes a service type indication, the service type indication is used to indicate any one of a voice service, a video service, or a short message service, and the connection setup request is any one of an initial UE message, an uplink non-access stratum NAS transport message, or a direct transfer message; where the receiving unit is further configured to receive, in a process of performing congestion control or overload control, a non-access stratum NAS request message sent by the UE; and a sending unit, configured to: if the non-access stratum NAS request message includes the service type indication, send an accept message corresponding to the NAS request message to the UE.

According to a third aspect, a mobility management network element is provided, including:

a receiving unit, configured to receive, in a process of performing congestion control or overload control, a non-access stratum NAS request sent by user equipment UE, where the NAS request includes a service type indication of a service initiated by the UE, and the service type indication is used to indicate any one of a voice service, a video service, or a short message service;

a determining unit, configured to determine, according to the service type indication, to accept the NAS request; and a sending unit, configured to send an accept message corresponding to the NAS request to the UE.

With reference to the third aspect, in a first possible implementation of the third aspect, the mobility management network element further includes:

a statistics collection unit, configured to perform, according to the service type indication, statistics collection and classification on types of services initiated by the UE.

With reference to the third aspect, in a second possible implementation of the third aspect, the sending unit is further configured to send the service type indication and an identifier of the UE to another core network element.

According to a fourth aspect, user equipment UE is provided, including:

a sending unit, configured to send a radio resource control RRC connection request to a base station, where the RRC connection request includes a service type indication of a service initiated by the UE, and the service type indication is used to indicate any one of a voice service, a video service, or a short message service; and a receiving unit, configured to receive an RRC connection setup message sent by the base station, where the RRC connection setup message is sent by the base station according to the service type indication when the base station performs congestion control or overload control.

According to a fifth aspect, user equipment UE is provided, including:

a sending unit, configured to send a non-access stratum NAS request message to a mobility management network element, where the NAS request message includes a service type indication of a service initiated by the UE, and the service type indication is used to indicate any one of a voice service, a video service, or a short message service; and a receiving unit, configured to receive an accept message that is corresponding to the NAS request message and that is sent by the mobility management network element, where the accept message is sent by the mobility management network element according to the service type indication when the mobility management network element performs congestion control or overload control.

According to a sixth aspect, a service processing method is provided, including:

receiving, by a base station in a process of performing congestion control or overload control, a radio resource control RRC connection request sent by user equipment UE, where the RRC connection request includes a service type indication of a service initiated by the UE, and the service type indication is used to indicate any one of a voice service, a video service, or a short message service;

determining, by the base station according to the service type indication, to establish an RRC connection for the UE; and sending, by the base station, an RRC connection setup message to the UE.

With reference to the sixth aspect, in a first possible implementation of the sixth aspect, after the base station determines, according to the service type indication, to send the RRC connection setup message to the UE, the method further includes:

sending, by the base station, a connection setup request to a mobility management network element, where the connection setup request includes the service type indication, so that in a process of performing the congestion control or the overload control, if the mobility management network element receives a non-access stratum NAS request message that is sent by the UE and that includes the service type indication, the mobility management network element determines to send an accept message corresponding to the NAS request message to the UE; where the connection setup request is any one of an initial UE message, an uplink non-access stratum NAS transport message, or a direct transfer message.

With reference to the sixth aspect, in a second possible implementation of the sixth aspect, the method further includes:

performing, by the base station according to the service type indication, statistics collection and classification on types of services initiated by the UE.

With reference to the sixth aspect, in a third possible implementation of the sixth aspect, the method further includes:

when the service that is initiated by the UE and that is corresponding to the service type indication is handed over, sending, by the base station, the service type indication and an identifier of the UE to a target base station to which the service is handed over.

According to a seventh aspect, a service processing method is provided, including:

receiving, by a mobility management network element, a connection setup request sent by a base station, where the connection setup request includes a service type indication, the service type indication is used to indicate any one of a voice service, a video service, or a short message service, and the connection setup request is any one of an initial UE message, an uplink non-access stratum NAS transport message, or a direct transfer message;

receiving, by the mobility management network element in a process of performing congestion control or overload control, a non-access stratum NAS request message sent by the UE; and if the non-access stratum NAS request message includes the service type indication, sending, by the mobility management network element, an accept message corresponding to the NAS request message to the UE.

According to an eighth aspect, a service processing method is provided, including:

receiving, by a mobility management network element in a process of performing congestion control or overload control, a connection setup request sent by user equipment UE, where the NAS request includes a service type indication of a service initiated by the UE, and the service type indication is used to indicate any one of a voice service, a video service, or a short message service;

when receiving the NAS request sent by the UE, determining, by the mobility management network element according to the service type indication, to accept the NAS request; and sending, by the mobility management network element, an accept message corresponding to the NAS request to the UE.

With reference to the eighth aspect, in a first possible implementation of the eighth aspect, the method further includes:

performing, by the mobility management network element according to the service type indication, statistics collection and classification on types of services initiated by the UE.

With reference to the eighth aspect, in a second possible implementation of the eighth aspect, the method further includes:

sending, by the mobility management network element, the service type indication and an identifier of the UE to another core network element.

According to a ninth aspect, a service processing method is provided, including:

sending, by user equipment UE, a radio resource control RRC connection request to a base station, where the RRC connection request includes a service type indication of a service initiated by the UE, and the service type indication is used to indicate any one of a voice service, a video service, or a short message service; and receiving, by the UE, an RRC connection setup message sent by the base station, where the RRC connection setup message is sent by the base station according to the service type indication when the base station performs congestion control or overload control.

According to a tenth aspect, a service processing method is provided, including:

sending, by user equipment UE, a non-access stratum NAS request message to a mobility management network element, where the NAS request message includes a service type indication of a service initiated by the UE, and the service type indication is used to indicate any one of a voice service, a video service, or a short message service; and receiving, by the UE, an accept message that is corresponding to the NAS request message and that is sent by the mobility management network element, where the accept message is sent by the mobility management network element according to the service type indication when the mobility management network element performs congestion control or overload control.

According to an eleventh aspect, a base station is provided, including:

a receiver, configured to receive, in a process of performing congestion control or overload control, a radio resource control RRC connection request sent by user equipment UE, where the RRC connection request includes a service type indication of a service initiated by the UE, and the service type indication is used to indicate any one of a voice service, a video service, or a short message service;

a processor, configured to determine, according to the service type indication, to establish an RRC connection for the UE; and a transmitter, configured to send an RRC connection setup message to the UE.

According to a twelfth aspect, a mobility management network element is provided, including:

a receiver, configured to receive a connection setup request sent by a base station, where the connection setup request includes a service type indication, the service type indication is used to indicate any one of a voice service, a video service, or a short message service, and the connection setup request is any one of an initial UE message, an uplink non-access stratum NAS transport message, or a direct transfer message; where the receiver is further configured to receive, in a process of performing congestion control or overload control, a non-access stratum NAS request message sent by the UE; and a transmitter, configured to: if the non-access stratum NAS request message includes the service type indication, send an accept message corresponding to the NAS request message to the UE.

According to a thirteenth aspect, a mobility management network element is provided, including:

a receiver, configured to receive, in a process of performing congestion control or overload control, a non-access stratum NAS request sent by user equipment UE, where the NAS request includes a service type indication of a service initiated by the UE, and the service type indication is used to indicate any one of a voice service, a video service, or a short message service;

a processor, configured to determine, according to the service type indication, to accept the NAS request; and a transmitter, configured to send an accept message corresponding to the NAS request to the UE.

According to a fourteenth aspect, user equipment UE is provided, including:

a transmitter, configured to send a radio resource control RRC connection request to a base station, where the RRC connection request includes a service type indication of a service initiated by the UE, and the service type indication is used to indicate any one of a voice service, a video service, or a short message service; and a receiver, configured to receive an RRC connection setup message sent by the base station, where the RRC connection setup message is sent by the base station according to the service type indication when the base station performs congestion control or overload control.

According to a fifteenth aspect, user equipment UE is provided, including:

a transmitter, configured to send a non-access stratum NAS request message to a mobility management network element, where the NAS request message includes the service type indication of a service initiated by the UE, and the service type indication is used to indicate any one of a voice service, a video service, or a short message service; and a receiver, configured to receive an accept message that is corresponding to the NAS request message and that is sent by the mobility management network element, where the accept message is sent by the mobility management network element according to the service type indication when the mobility management network element performs congestion control or overload control.

According to a sixteenth aspect, a communications system is provided, including the base station provided in the eleventh aspect, the mobility management network element provided in the twelfth aspect or the thirteenth aspect, and the user equipment provided in the fourteenth aspect or the fifteenth aspect.

The embodiments of the present invention provide a service processing method, a related apparatus, and a system. User equipment UE adds a service type indication of a service initiated by the UE to a radio resource control RRC connection request and sends the RRC connection request to a base station. If the service type indication is used to indicate a voice service, a video service, or a short message service (it means that the service initiated by the UE is a voice service, a video service, or a short message service), when the base station performs congestion control or overload control, the base station may not reject the RRC connection request according to the service type indication, and send an RRC connection setup message to the UE, thereby ensuring that a subsequent service is successfully performed, and resolving a prior-art problem that a service, such as a voice service, a video service, or a short message service of user equipment fails to be established because a network side performs congestion control or overload control. Similarly, the UE may add the service type indication of the service initiated by the UE to a non-access stratum NAS request and send the NAS request to a mobility management network element. If the service type indication is used to indicate a voice service, a video service, or a short message service, when congestion control or overload control is performed on the network side, the mobility management network element may not reject the NAS request according to the service type indication, and send an accept message corresponding to the NAS request message to the UE. In this way, it can be ensured that the service, such as a voice service, a video service, or a short message service of the user equipment is successfully established even if congestion control or overload control is performed on the network side.

BRIEF DESCRIPTION OF DRAWINGS

To describe the technical solutions in the embodiments of the present invention more clearly, the following briefly describes the accompanying drawings required for describing the embodiments or the conventional art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
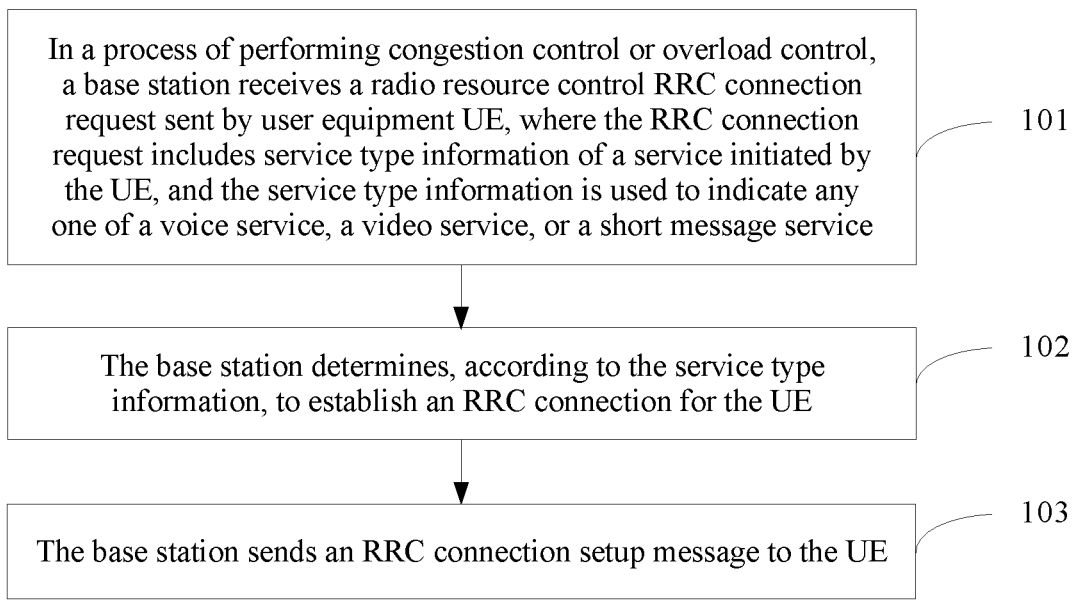
FIG. 1 is a schematic flowchart of a service processing method according to an embodiment of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The embodiments of the present invention may be applied to an evolved packet system (EPS) network. The EPS network is introduced by the 3rd Generation Partnership Project (3GPP) based on a Global System for Mobile Communications/Enhanced Data rates for GSM Evolution (GSM/EDGE) in the second generation mobile communications network and a Universal Mobile Telecommunications System (UMTS) in the third generation mobile communications network. The EPS network includes an evolved universal mobile telecommunication system terrestrial radio access network (E-UTRAN) and an evolved packet core network (EPC). With evolution and commercial deployment of the EPS network, increasingly more types of terminals need to access the EPC network by using the E-UTRAN network.

In the embodiments of the present invention, user equipment (UE) may be any one of the following, and the UE may be still or moving. The UE may include but is not limited to a station, a mobile station, a subscriber unit, a personal computer, a laptop computer, a tablet computer, a netbook, a terminal, a cellular phone, a handheld device, a cordless phone, a personal digital assistant (PDA for short), a data card, a Universal Serial Bus (USB for short) inserting device, a mobile WiFi hotspot device (WiFi Devices), a smart watch, smart glasses, a wireless modem (Modem), a wireless router, a wireless local loop (WLL for short) station, and the like. The UE may be distributed in an entire wireless network.

In the embodiments of the present invention, a base station may be a fourth-generation base station that provides a Long Term Evolution (LTE) network access service, for example, an evolved NodeB (eNodeB), or may be a third-generation base station that provides a third-generation 3G network access service, for example, a radio network subsystem (RNS). A mobility management network element may be either a mobility management entity (MME) or a serving GPRS support node (SGSN).

In the embodiments of the present invention, a service initiated by the UE may be an instant messaging service, such as a voice service, a video service, or a short message service. The voice service is a service that transfers a sound, and mainly includes an ordinary call and an IP call. The video service is a communications service that provides video content for a user by using a network and a terminal. The short message service is a service provided by an operator or another value-added service provider based on a short message service provided by the operator, such as bill enquiry or voting by means of a short message service message.

It should be noted that the instant messaging service may be an IMS service, or may be a conventional circuit switched (CS) service or the like. For example, a voice or a short message is transferred by using QQ or WeChat. This is not limited in the embodiments of the present invention. In description of the following embodiments of the present invention, all of a voice service, a video service, and a short message service are IMS services.

An embodiment of the present invention provides a service processing method. As shown in FIG. 1, the method includes the following steps.

101. In a process of performing congestion control or overload control, a base station receives a radio resource control RRC connection request sent by user equipment UE, where the RRC connection request includes a service type indication of a service initiated by the UE, and the service type indication is used to indicate any one of a voice service, a video service, or a short message service.

102. The base station determines, according to the service type indication, to establish an RRC connection for the UE.

The base station may determine, according to the service type indication, that the service initiated by the UE is a voice service, a video service, or a short message service, and determine to establish the RRC connection for the UE.

103. The base station sends an RRC connection setup message to the UE.

Before step 101, the UE needs to be successfully registered with a network side. After the registering succeeds, when an IMS layer of the UE initiates a request for an IMS service, such as a voice service, a video service, or a short message service, the IMS layer sends a start indication of the IMS service to a NAS layer of the UE. The indication includes a corresponding IMS service type indication. After the NAS layer receives the start indication of the IMS service, if the UE is currently in an idle state, before sending a NAS request to a mobility management network element, the NAS layer of the UE requests an AS layer of the UE to initiate an RRC connection request to the base station, and sends the IMS service type indication to the AS layer of the UE. The service type indication may be used to indicate a service, such as a voice service, a video service, or a short message service. It should be noted that, in addition to the IMS layer, the short message service may be initiated by a short message service layer.

Further, before initiating the RRC connection request, the UE may first determine whether there is access barring, to avoid excessively heavy cell load. Specifically, when the NAS layer instructs the AS layer of the UE to initiate the RRC connection request, the AS layer finds that a type of the IMS service is a type of a service that is broadcast by an access network base station and that can skip access barring of access class barring ACB. Therefore, the AS layer skips the access barring of the ACB, so that the AS layer directly initiates the RRC connection request to the base station.

In this way, when the AS layer of the UE receives an instruction for initiating the RRC connection request and skips an ACB mechanism, in step 101, the UE sends the RRC connection request to the base station. The RRC connection request includes a service type indication of a service initiated by the UE at this moment.

Further, in step 102, if the base station does not perform congestion control or overload control, the base station processes a received message in a normal processing manner. In step 101, if the RRC connection request sent by the UE is received in a process in which the network side decides to perform congestion control or overload control because network load increases, the base station rejects the received RRC connection request message in the conventional art. However, in a technology of the present invention, the RRC connection request carries the service type indication, so that the base station can determine, according to the service type indication, the type of the service initiated by the UE. If the base station determines that the service initiated by the UE is a voice service, a video service, a short message service, or the like, the base station may determine to accept the RRC connection request, that is, determine to establish the RRC connection for the UE. The service type indication is used to indicate any one of a voice service, a video service, or a short message service, or may be used to indicate another type. This is not limited in the present invention. Therefore, in step 103, the base station sends the RRC connection setup message to the UE. That is, when a network is congested or overloaded, according to the service type indication, the base station does not reject the RRC connection request sent by the UE. In this way, an instant messaging service, such as a voice service, a video service, or a short message service, initiated by the UE may normally access the network when the base station performs congestion control or overload control, thereby ensuring that a subsequent service is successfully performed.

The RRC connection setup message sent by the base station to the UE includes bearer information of a signaling radio bearer (SRB) established by the base station for the UE and radio resource configuration information, so as to notify the UE that the base station accepts the RRC connection. After receiving the RRC connection setup message, the UE sends an RRC connection complete message to the base station according to the configuration information, to complete a three-way handshake with the base station to access the network. Congestion control is warning control, and is control performed when signaling load reaches a specified threshold. Congestion control is performed to avoid overload, and the network side is actually not overloaded when congestion control is performed. Overload control is capability-based control, and the network side is already in an overload state when overload control is performed. Overload control is performed to turn the network side into a non-overloaded state.

When the base station receives the service type indication of the UE to determine that the UE can access the base station, the base station may further perform, according to the service type indication, statistics collection and classification on types of services initiated by the UE, so that a user or an operator enquires establishment statuses of different types of services on the network side. For example, the operator may enquire a service status of the voice service according to the service type indication.

In addition, when the user moves out of a service area of a current serving base station during service processing, and the base station hands over the service that is initiated by the UE and that is corresponding to the service type indication, the base station may further send the service type indication and an identifier of the UE to a target base station to which the service is handed over. Therefore, when a connection between the UE and the target base station is being established, if the target base station performs congestion control or overload control, the UE successfully accesses the target base station, thereby ensuring continuity of the current service. Certainly, the target base station may further perform statistics collection and classification on service type indications.

After the UE completes a signaling connection to an access network, that is, the base station, a status of the UE changes to a connection state. Then, the UE sends a NAS request message to complete a signaling connection to a core network, that is, the mobility management network element, thereby establishing an air interface bearer required by subsequent user plane data transmission. For example, when the mobility management network element is an MME, the MME mainly completes user registration, bearer establishment, and a user location update. Therefore, after the RRC connection between the UE and the base station is established, the UE sends the NAS request message to the MME, to request to access the MME. The NAS request message may also include the service type indication. In this way, if the network is congested or overloaded when the MME receives the NAS request message, the MME does not reject the NAS request message, and sends an accept message corresponding to the NAS request message to the UE. The service type indication is used to indicate any one of a voice service, a video service, or a short message service. Therefore, when the network is congested or overloaded, it can be ensured that a NAS procedure between the UE and the MME is successfully performed, thereby ensuring that an IMS service is preferentially performed.

The NAS request message may be a location update request (Tracking Area Updating Request, TAU) message when the mobility management network element is the MME. For example, when a location of the UE in an LTE network changes, or the UE returns from a 2/3G network to an LTE network, or a periodic location update timer expires, the UE sends a TAU to the MME. The NAS request message may be a service request message. For example, when performing a service, such as a voice service or a video service, idle UE may send a service request to the MME. The NAS request message may be an extended service request message. For example, when the UE needs to perform a circuit switched CS voice service, the UE initiates the extended service request message to instruct the MME to perform a fallback, so that the UE initiates reselection or a handover, to complete a circuit switched fallback (CSFB) procedure.

Similar to the base station, when receiving the NAS request message that is sent by the UE and that carries the service type indication, the MME may perform statistics collection and classification on service types, or send the service type indication to another core network element.

Figure 2:
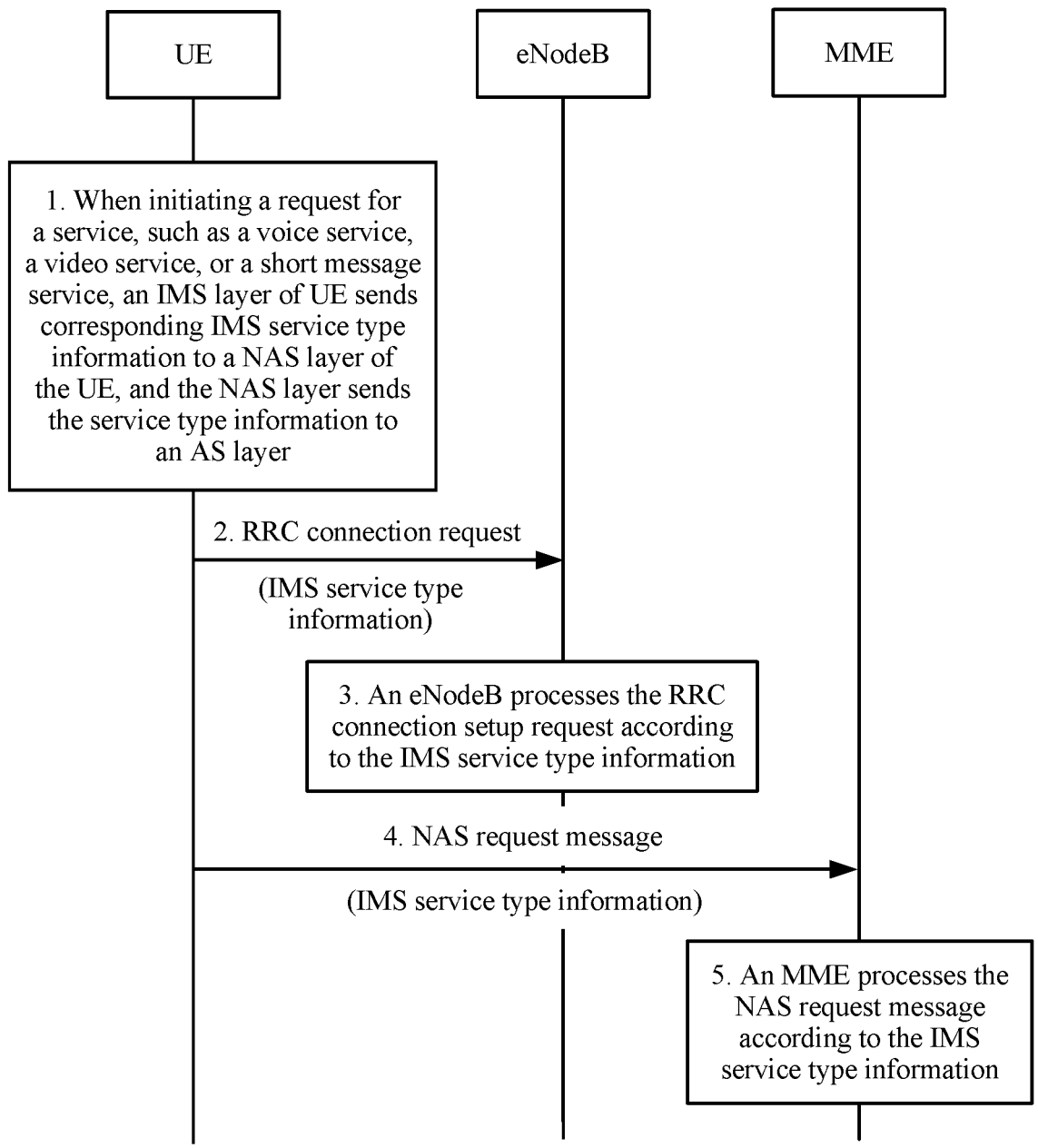
FIG. 2 is a schematic flowchart of another service processing method according to an embodiment of the present invention.

A signaling flowchart among the UE, the base station, and the MME may be shown in FIG. 2.

In addition, when receiving the service type indication carried in the RRC connection request sent by the UE, the base station may further send the service type indication to the mobility management network element when establishing a connection to the mobility management network element. In this way, if the network is congested when the mobility management network element receives the NAS request message of the UE, the mobility management network element can accept, according to the service type indication, the NAS request message sent by the UE. Therefore, based on step 103, the method may further include the following step:

104. The base station sends a connection setup request to a mobility management network element, where the connection setup request includes the service type indication, so that in a process of performing congestion control or overload control, if the mobility management network element receives a non-access stratum NAS request message that is sent by the UE and that includes the service type indication, the mobility management network element determines to send an accept message corresponding to the NAS request message to the UE.

If the NAS request message sent by the UE to the mobility management network element carries the service type indication, the base station may not send the service type indication to the mobility management network element; or if the NAS request message sent by the UE to the mobility management network element does not carry the service type indication, the base station sends the service type indication to the MME.

For example, when the mobility management network element is the MME, the base station may send, by using an S1 interface between the base station and the MME, an S1 connection setup request message that includes the service type indication to the MME. The S1 connection setup request message may be an initial UE message, so that the MME establishes a context for the UE. Alternatively, the S1 connection setup request message may be an uplink NAS transport message, and the message may include a NAS TAU complete message for notifying that an MME TAU process is completed, so that the MME sends a UE context release command message to the base station to instruct the base station to release the context of the UE. Alternatively, the S1 connection setup request message may be a direct transfer message, or the like for transmitting a NAS request message.

This embodiment of the present invention provides a service processing method. In a process of performing congestion control or overload control, a base station receives a radio resource control RRC connection request sent by UE, where the RRC connection request includes a service type indication of a service initiated by the UE, and the service type indication is used to indicate any one of a voice service, a video service, or a short message service. The base station may determine, according to the service type indication, that the service initiated by the UE is a voice service, a video service, or a short message service, and send an RRC connection setup message to the UE, that is, accept the RRC connection request, so that the UE completes an access stratum signaling connection to the base station. Similarly, the UE may add the service type indication to a NAS request message and send the NAS request message to a mobility management network element. In this way, when performing congestion control or overload control, the mobility management network element may determine, according to the service type indication, to accept the NAS request, so as to complete a non-access stratum connection to the UE and ensure that an IMS service of the UE is successfully performed, thereby resolving a prior-art problem that a service, such as a voice service, a video service, or a short message service of user equipment fails to be established because a network side performs congestion control or overload control.

Figure 3A:
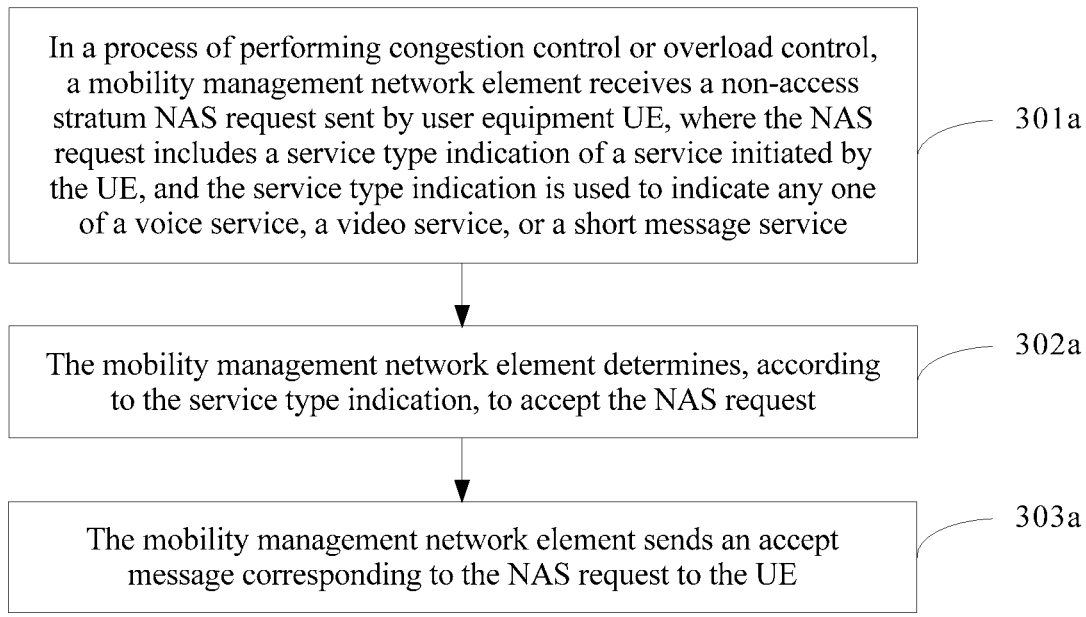
FIG. 3a is a schematic flowchart of another service processing method according to an embodiment of the present invention.

Corresponding to the foregoing method, from a perspective of a mobility management network element side, an embodiment of the present invention provides a service processing method. As shown in FIG. 3a, the method includes the following steps:

301a. In a process of performing congestion control or overload control, a mobility management network element receives a non-access stratum NAS request sent by user equipment UE, where the NAS request includes a service type indication of a service initiated by the UE, and the service type indication is used to indicate any one of a voice service, a video service, or a short message service.

302a. The mobility management network element determines, according to the service type indication, to accept the NAS request.

The mobility management network element may determine, according to the service type indication, that the service initiated by the UE is a voice service, a video service, or a short message service, and determine to accept the NAS request.

303a. The mobility management network element sends an accept message corresponding to the NAS request to the UE.

For example, when the mobility management network element is an MME, the MME is mainly responsible for all control plane functions of a user and session management. The control plane functions include NAS signaling and security of the NAS signaling, tracking area list management, management of a new MME during a cross-MME handover, selection, authentication, roaming control, and bearer management of a serving GPRS support node (SGSN) in a process of a handover to a 2G/3G system, mobility management of different 3GPP radio access network core nodes, mobility management of UE in an idle state, and the like.

Before step 301a, the UE needs to complete establishment of an access stratum signaling connection to a base station. Specifically, the UE may add the service type indication of the initiated service to an RRC connection request message and send the RRC connection request message to the base station. In this way, if a network is congested when the base station determines that the service initiated by the UE is a designated type of service, the base station accepts the RRC connection request of the UE, to complete the establishment of the access stratum signaling connection to the UE. After the access stratum signaling connection between the UE and the base station is successfully established, the UE can send the NAS request to the mobility management network element by using the access stratum signaling connection.

After the UE completes the establishment of the access stratum signaling connection, in step 301a, the UE sends the non-access stratum NAS request to the mobility management network element, for example, the MME, and the request includes the service type indication of the service initiated by the UE. In this way, in step 301a, if the MME receives the NAS request in the process of performing congestion control or overload control, in step 302a, the MME may accept, according to the service type indication, the NAS request sent by the UE. Then, in step 303a, the mobility management network element sends the accept message corresponding to the NAS request to the UE. Therefore, the UE accesses a core network, and establishes a user plane bearer with the MME, to ensure that an IMS service is successfully performed.

In addition, the mobility management network element may further perform statistics collection and classification on service types according to the service type indication, to help a user or an operator with service enquiry. The mobility management network element may further send the service type indication to another core network element. The another core network element is a mobility management network element MME, an SGSN, a serving gateway, a packet data network PDN, a gateway, or the like.

Figure 3B:
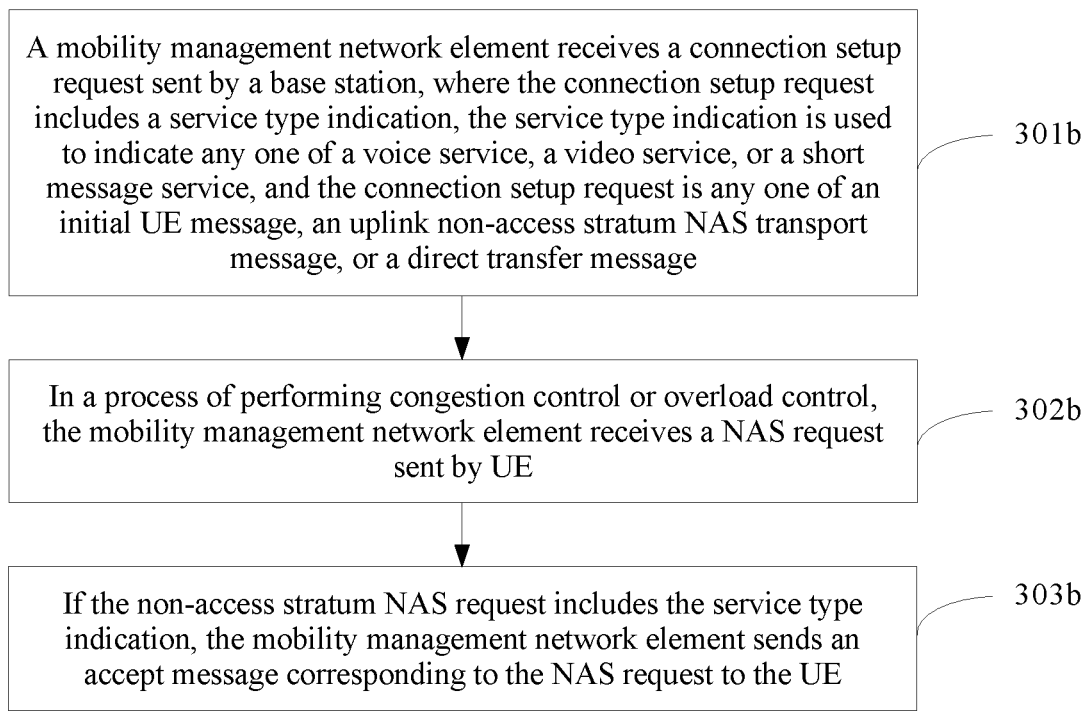
FIG. 3b is a schematic flowchart of another service processing method according to an embodiment of the present invention.

In another possible implementation, after receiving the RRC connection request that is sent by the UE and that carries the service type indication, the base station may add the service type indication to a connection setup request and send the connection setup request to the mobility management network element. In this way, when receiving the NAS request that is sent by the UE and that carries the service type indication, if congestion control or overload control is performed, the mobility management network element may not reject the NAS request, to ensure that a service is successfully performed. Therefore, in another possible implementation, as shown in FIG. 3b, the method in this embodiment of the present invention may include the following steps:

301b. A mobility management network element receives a connection setup request sent by a base station, where the connection setup request includes a service type indication, the service type indication is used to indicate any one of a voice service, a video service, or a short message service, and the connection setup request is any one of an initial UE message, an uplink non-access stratum NAS transport message, or a direct transfer message.

302b. In a process of performing congestion control or overload control, the mobility management network element receives a NAS request sent by UE.

303b. If the non-access stratum NAS request includes the service type indication, the mobility management network element sends an accept message corresponding to the NAS request to the UE.

Figure 4:
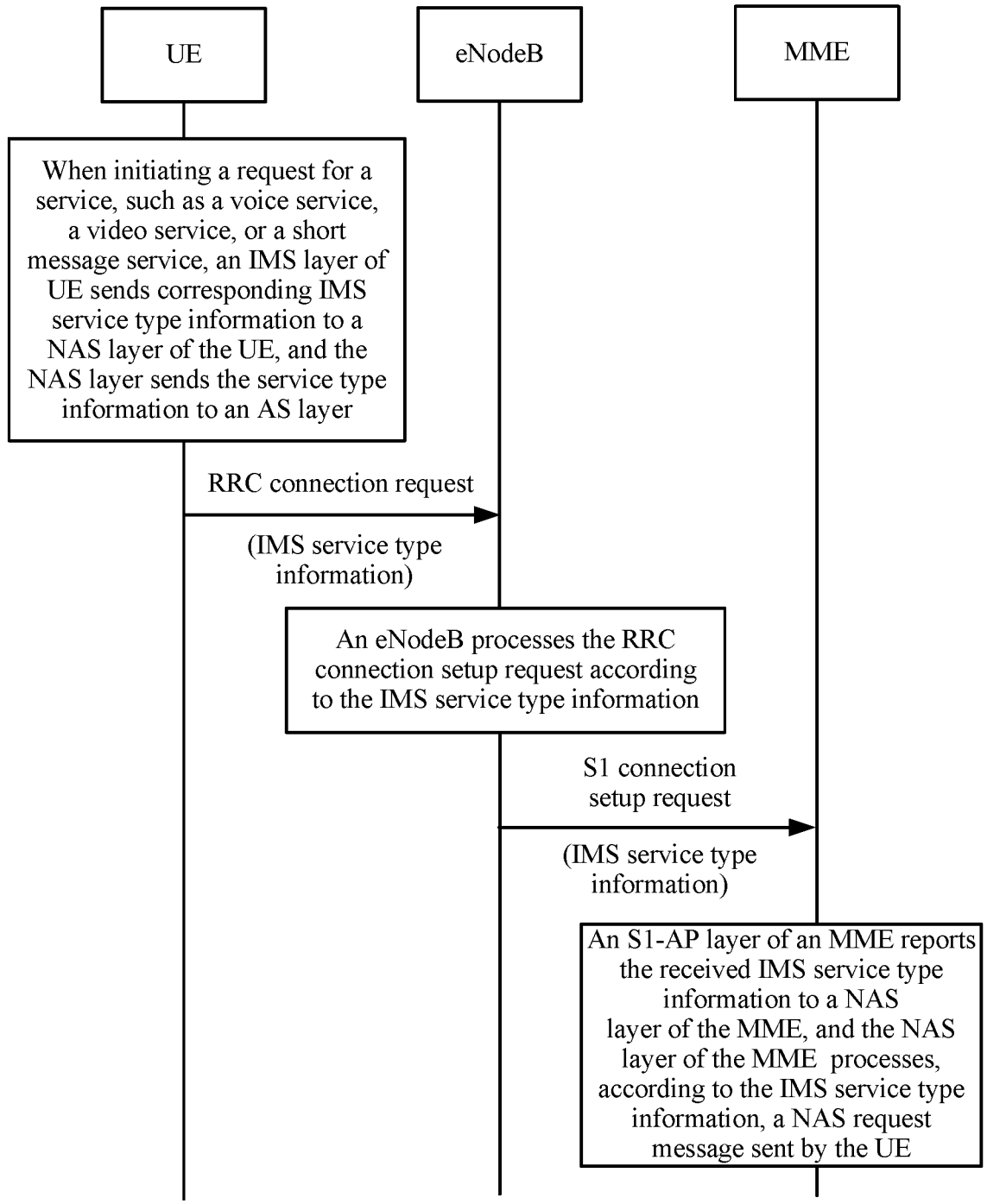
FIG. 4 is a schematic flowchart of another service processing method according to an embodiment of the present invention.

For example, after the UE completes establishment of an access stratum signaling connection to the base station, the UE adds service type indication of an initiated service to an RRC connection request message and sends the RRC connection request message to the base station. In this way, in step 301b, the base station adds the service type indication to the connection setup request and sends the connection setup request to the mobility management network element. For example, when the mobility management network element is an MME, an S1 connection setup request that is received by the MME and that is sent by the base station includes the service type indication. The S1 connection setup request is an initial UE message, an uplink non-access stratum NAS transport message, a direct transfer message, or the like. After receiving the carried service type indication, an S1 application protocol layer of the MME sends the service type indication to a NAS layer of the MME. In this case, in step 302b, if a network is congested, and the MME receives the NAS request that is sent by the UE and that carries the service type indication, the NAS layer of the MME accepts the NAS request according to the service type indication, that is, processes a NAS request message that is of this service type and that is sent by the UE, and establishes a user plane bearer for the UE, to ensure that an IMS service is successfully performed. In this case, a signaling flow among the UE, the base station, and the MME may be shown in FIG. 4.

This embodiment of the present invention provides a service processing method. After UE completes establishment of an access stratum signaling connection to a base station, in a process of performing congestion control or overload control, a mobility management network element receives a NAS request sent by the UE, where the NAS request includes a service type indication of a service initiated by the UE, and the service type indication is used to indicate any one of a voice service, a video service, or a short message service. The mobility management network element may determine, according to the service type indication, that the service initiated by the UE is a voice service, a video service, or a short message service, and send an accept message corresponding to the NAS request to the UE, that is, accept the NAS request message, to complete establishment of a non-access stratum connection to the UE, thereby ensuring that an IMS service initiated by the UE is successfully performed. Similarly, when a connection between the base station and the mobility management network element is established, a connection request sent by the base station includes the service type indication. When the mobility management network element performs congestion control or overload control, the mobility management network element may accept, according to the service type indication, the NAS request message that is sent by the UE and that includes the service type indication, to complete establishment of the non-access stratum connection to the UE and ensure that the IMS service initiated by the UE is successfully performed, thereby resolving a prior-art problem that a service, such as a voice service, a video service, or a short message service of user equipment fails to be established because a network side performs congestion control or overload control.

Figure 5A:
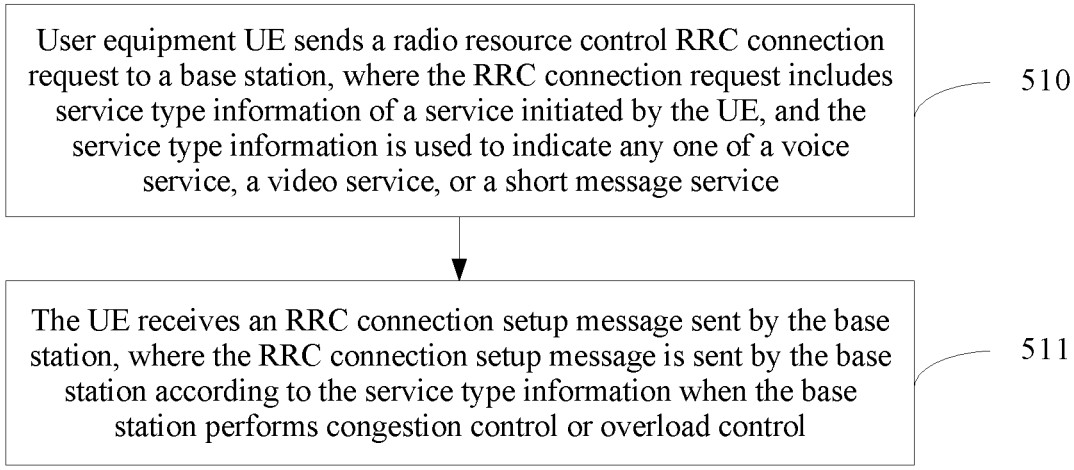
FIG. 5a is a schematic flowchart of another service processing method according to an embodiment of the present invention.

Corresponding to the foregoing method embodiment, from a perspective of a UE side, an embodiment of the present invention provides a service processing method. As shown in FIG. 5a, the method includes the following steps:

510. User equipment UE sends a radio resource control RRC connection request to a base station, where the RRC connection request includes a service type indication of a service initiated by the UE, and the service type indication is used to indicate any one of a voice service, a video service, or a short message service.

511. The UE receives an RRC connection setup message sent by the base station, where the RRC connection setup message is sent by the base station according to the service type indication when the base station performs congestion control or overload control.

An IMS service, such as a voice service, a video service, or a short message service of the UE, is provided by using a user plane of an EPS network. For sending of user plane data, the UE needs to first establish a signaling connection to a network side, to change a status of the UE into a connection state. Establishment of the signaling connection includes initiating, by the UE, an access stratum signaling connection to an access network and initiating a non-access stratum signaling connection to a core network. In step 510, the UE adds the service type indication of the UE to the RRC connection request and sends the RRC connection request to the base station, so as to ensure that the UE successfully accesses the network side. If network congestion occurs on the network side, the base station accepts the RRC connection request according to the service type indication. In this way, in step 511, the UE receives the RRC connection setup message sent by the base station, and then the UE sends an RRC connection complete message to the base station, to complete a three-way handshake with the base station, thereby completing an access stratum signaling connection to the base station.

Figure 5B:
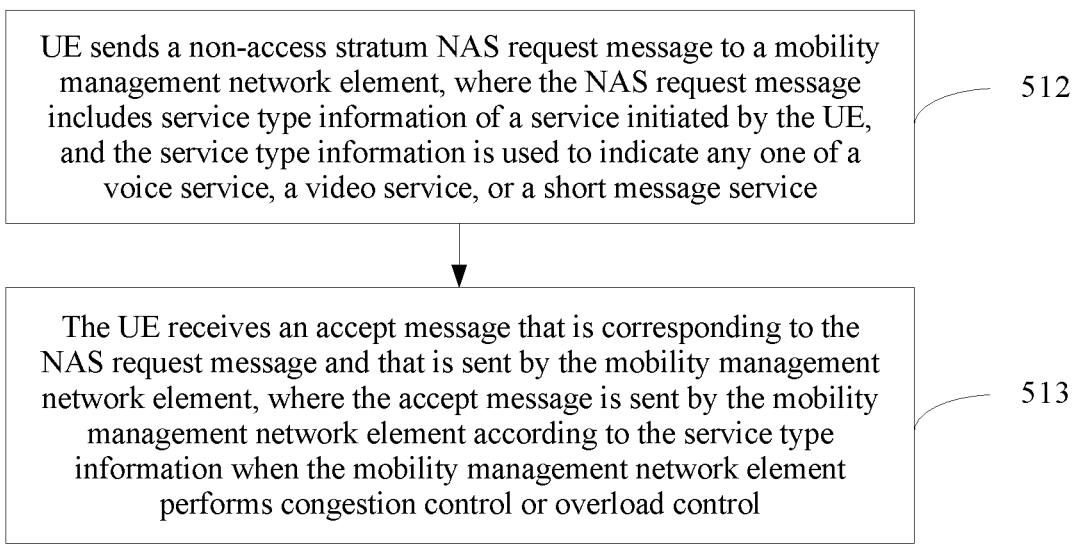
FIG. 5b is a schematic flowchart of another service processing method according to an embodiment of the present invention.

The UE further needs to complete a non-access stratum signaling connection to the mobility management network element after completing the access stratum signaling connection. Therefore, this embodiment further provides a service processing method. As shown in FIG. 5b, the method includes the following steps:

512. UE sends a non-access stratum NAS request message to a mobility management network element, where the NAS request message includes a service type indication of a service initiated by the UE, and the service type indication is used to indicate any one of a voice service, a video service, or a short message service.

513. The UE receives an accept message that is corresponding to the NAS request message and that is sent by the mobility management network element, where the accept message is sent by the mobility management network element according to the service type indication when the mobility management network element performs congestion control or overload control.

That is, if a network is congested when the mobility management network element receives the NAS request message that is sent by the UE and that carries the service type indication, the mobility management network element accepts the NAS request message according to the service type indication, and sends the accept message corresponding to the NAS request message to the UE, so that the UE successfully accesses a core network, and successfully performs mobility management and session management between the UE and the mobility management network element, thereby ensuring that an IMS service is successfully performed.

This embodiment of the present invention provides a service processing method. UE sends a radio resource control RRC connection request to a base station, where the RRC connection request includes a service type indication of a service initiated by the UE, and the service type indication is used to indicate any one of a voice service, a video service, or a short message service. When congestion control or overload control is performed on a base station side, the UE receives an RRC connection setup message sent by the base station, to complete a three-way handshake with the base station. Similarly, the UE sends a non-access stratum NAS request message to a mobility management network element when accessing a core network, where the NAS request message may also include the service type indication. The mobility management network element accepts the NAS request message if the mobility management network element performs congestion control or overload control, so that the UE successfully accesses the core network and an IMS service is successfully performed, thereby resolving a prior-art problem that a service, such as a voice service, a video service, or a short message service of user equipment fails to be established because a network side performs congestion control or overload control.

Figure 6:
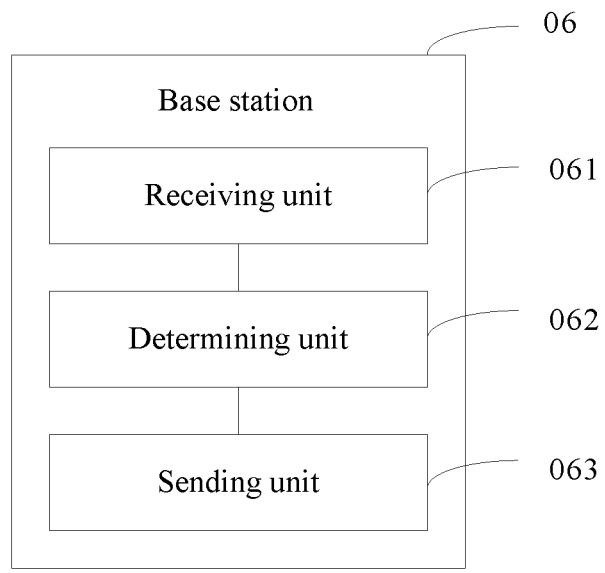
FIG. 6 is a schematic diagram of a base station according to an embodiment of the present invention.

As shown in FIG. 6, an embodiment of the present invention provides a base station 06, including:

a receiving unit 061, configured to receive, in a process of performing congestion control or overload control, a radio resource control RRC connection request sent by user equipment UE, where the RRC connection request includes a service type indication of a service initiated by the UE, and the service type indication is used to indicate any one of a voice service, a video service, or a short message service;

a determining unit 062, configured to determine, according to the service type indication, to establish an RRC connection for the UE; and a sending unit 063, configured to send an RRC connection setup message to the UE.

Optionally, the sending unit 063 is further configured to send a connection setup request to a mobility management network element, and the connection setup request includes the service type indication, so that in a process of performing congestion control or overload control, if the mobility management network element receives a non-access stratum NAS request message that is sent by the UE and that includes the service type indication, the mobility management network element determines to send an accept message corresponding to the NAS request message to the UE.

The connection setup request is an initial UE message, an uplink non-access stratum NAS transport message, or a direct transfer message.

For example, an S1 connection setup request may be sent to the mobility management network element by using an S1 interface between the base station and the mobility management network element. The S1 connection setup request includes the service type indication.

Figure 7:
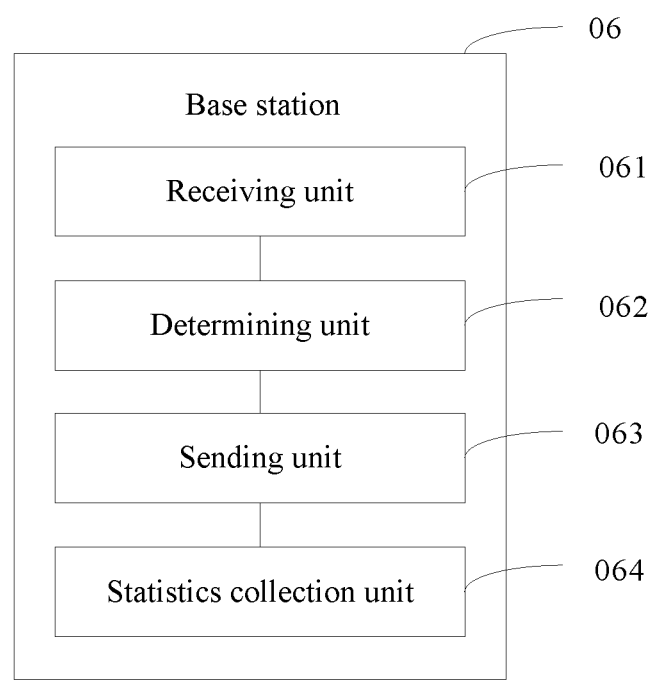
FIG. 7 is a schematic diagram of another base station according to an embodiment of the present invention.

Optionally, as shown in FIG. 7, the base station may further include a statistics collection unit 064, configured to perform, according to the service type indication, statistics collection and classification on types of services initiated by the UE.

Optionally, the sending unit 063 may be further configured to: when the service that is initiated by the UE and that is corresponding to the service type indication is handed over, send the service type indication and an identifier of the UE to a target base station to which the service is handed over.

This embodiment of the present invention provides a base station. In a process of performing congestion control or overload control, the base station receives a radio resource control RRC connection request sent by user equipment UE, where the RRC connection request includes a service type indication of a service initiated by the UE, and the service type indication is used to indicate any one of a voice service, a video service, or a short message service. The base station may determine, according to the service type indication, that the service initiated by the UE is a voice service, a video service, or a short message service, and send an RRC connection setup message to the UE, that is, accept the RRC connection request, so that the UE completes an access stratum signaling connection to the base station. Similarly, the base station may add the service type indication to a connection setup request message and send the connection setup request message to a mobility management network element. In this way, when performing congestion control or overload control, if the mobility management network element receives a NAS request message that is sent by the UE and that includes the service type indication, the mobility management network element may accept, according to the service type indication, the NAS request sent by the UE, to ensure that the service initiated by the UE is successfully performed, thereby resolving a prior-art problem that a service, such as a voice service, a video service, or a short message service of user equipment fails to be established because a network side performs congestion control or overload control.

Figure 8A:
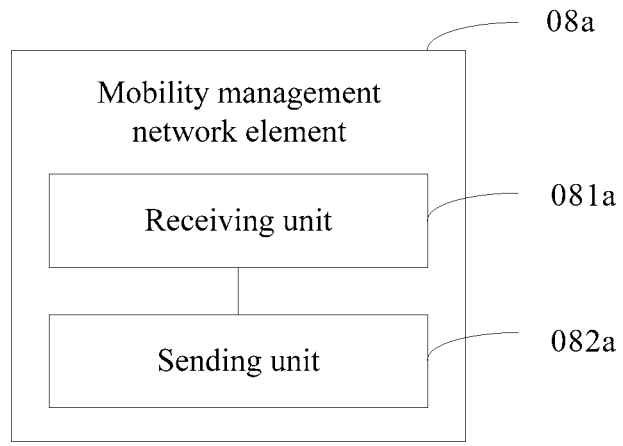
FIG. 8a is a schematic diagram of a mobility management network element according to an embodiment of the present invention.

As shown in FIG. 8a, an embodiment of the present invention provides a mobility management network element 08a, including:

a receiving unit 081a, configured to receive a connection setup request sent by a base station, where the connection setup request includes a service type indication, the service type indication is used to indicate any one of a voice service, a video service, or a short message service, and the connection setup request is any one of an initial UE message, an uplink non-access stratum NAS transport message, or a direct transfer message; where the receiving unit 081a is further configured to receive, in a process of performing congestion control or overload control, a non-access stratum NAS request message sent by UE; and a sending unit 082a, configured to: if the non-access stratum NAS request message includes the service type indication, send an accept message corresponding to the NAS request to the UE.

Figure 8B:
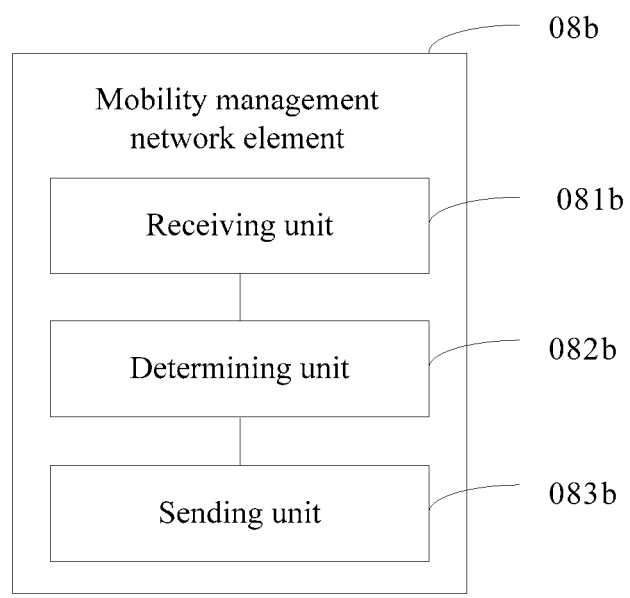
FIG. 8b is a schematic diagram of another mobility management network element according to an embodiment of the present invention.

As shown in FIG. 8b, an embodiment of the present invention further provides a mobility management network element 08b, including:

a receiving unit 081b, configured to receive, in a process of performing congestion control or overload control, a non-access stratum NAS request sent by user equipment UE, where the NAS request includes a service type indication of a service initiated by the UE, and the service type indication is used to indicate any one of a voice service, a video service, or a short message service;

a determining unit 082b, configured to determine, according to the service type indication, to accept the NAS request; and a sending unit 083b, configured to send an accept message corresponding to the NAS request to the UE.

Optionally, the NAS request may be a location update request (Tracking Area Update Request, TAU), a routing area update request (RAU), a service request, or an extended service request.

Figure 9:
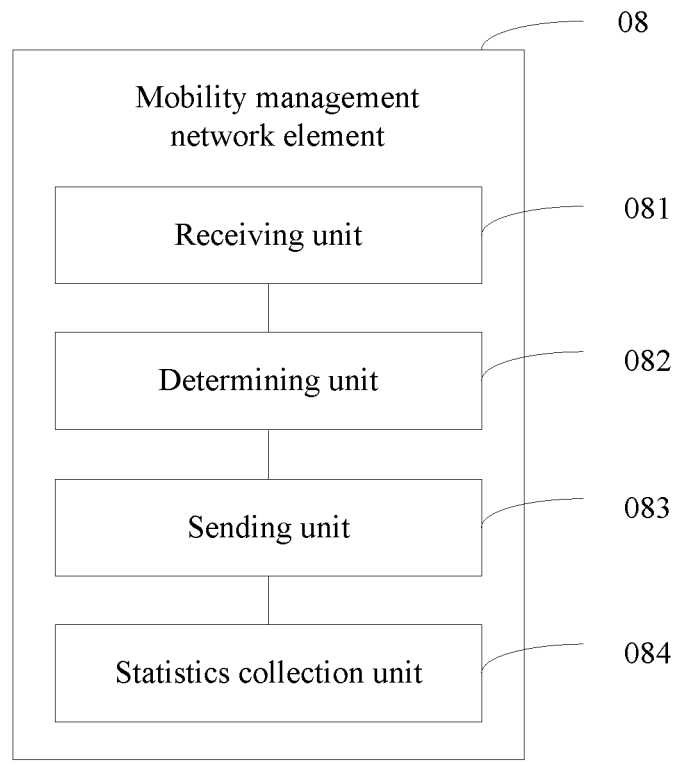
FIG. 9 is a schematic diagram of another mobility management network element according to an embodiment of the present invention.

Optionally, as shown in FIG. 9, the mobility management network element may further include a statistics collection unit 084b, configured to perform, according to the service type indication, statistics collection and classification on types of services initiated by the UE.

Optionally, the sending unit 083b may be further configured to send the service type indication and an identifier of the UE to another core network element. The another core network element herein may be a mobility management network element MME, an SGSN, a serving gateway (SGW), a packet data network (PDN), a gateway, or the like.

This embodiment of the present invention provides a mobility management network element. In a process in which congestion control or overload control is performed on a network side, the mobility management network element receives a NAS request sent by UE, where the NAS request carries a service type indication, and the service type indication is used to indicate any one of a voice service, a video service, or a short message service. In this way, the mobility management network element may determine, according to the service type indication, a service initiated by the UE is a voice service, a video service, or a short message service, and accept the NAS request sent by the UE, to complete establishment of a non-access stratum signaling connection to the UE. Similarly, a base station may add the service type indication of the service initiated by the UE to a connection setup request message and send the connection setup request message to the mobility management network element. In this way, in a process of performing congestion control or overload control, if the mobility management network element receives the NAS request that is sent by the UE and that includes the service type indication, the mobility management network element may accept the NAS request, to ensure that the service initiated by the UE is successfully performed, thereby resolving a prior-art problem that a service, such as a voice service, a video service, or a short message service of user equipment fails to be established because a network side performs congestion control or overload control.

Figure 10:
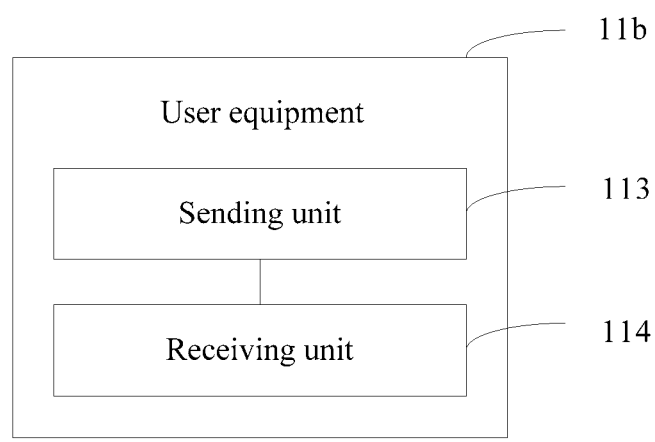
FIG. 10 is a schematic diagram of user equipment according to an embodiment of the present invention.

As shown in FIG. 10, an embodiment of the present invention provides user equipment 10, including:

a sending unit 101, configured to send a radio resource control RRC connection request to a base station, where the RRC connection request includes a service type indication of a service initiated by the UE, and the service type indication is used to indicate any one of a voice service, a video service, or a short message service; and a receiving unit 102, configured to receive an RRC connection setup message sent by the base station, where the RRC connection setup message is sent by the base station according to the service type indication when the base station performs congestion control or overload control.

With reference to an apparatus structure of the user equipment, in another possible implementation, the user equipment 10 includes:

a sending unit 101, configured to send a non-access stratum NAS request message to a mobility management network element, where the NAS request message includes a service type indication of a service initiated by the UE, and the service type indication is used to indicate any one of a voice service, a video service, or a short message service; and a receiving unit 102, configured to receive an accept message that is corresponding to the NAS request message and that is sent by the mobility management network element, where the accept message is sent by the mobility management network element according to the service type indication when the mobility management network element performs congestion control or overload control.

This embodiment of the present invention provides user equipment UE. The UE sends a radio resource control RRC connection request to a base station, where the RRC connection request includes a service type indication of a service initiated by the UE, and the service type indication is used to indicate any one of a voice service, a video service, or a short message service. When congestion control or overload control is performed on a base station side, the UE receives an RRC connection setup message sent by the base station, to complete a three-way handshake with the base station. Similarly, the UE sends a non-access stratum NAS request message to a mobility management network element when accessing a core network, where the NAS request message may also include the service type indication. The mobility management network element accepts the NAS request message if the mobility management network element performs congestion control or overload control, so that the UE successfully accesses the core network and an IMS service is successfully performed, thereby resolving a prior-art problem that a service, such as a voice service, a video service, or a short message service of user equipment fails to be established because a network side performs congestion control or overload control.

Figure 11:
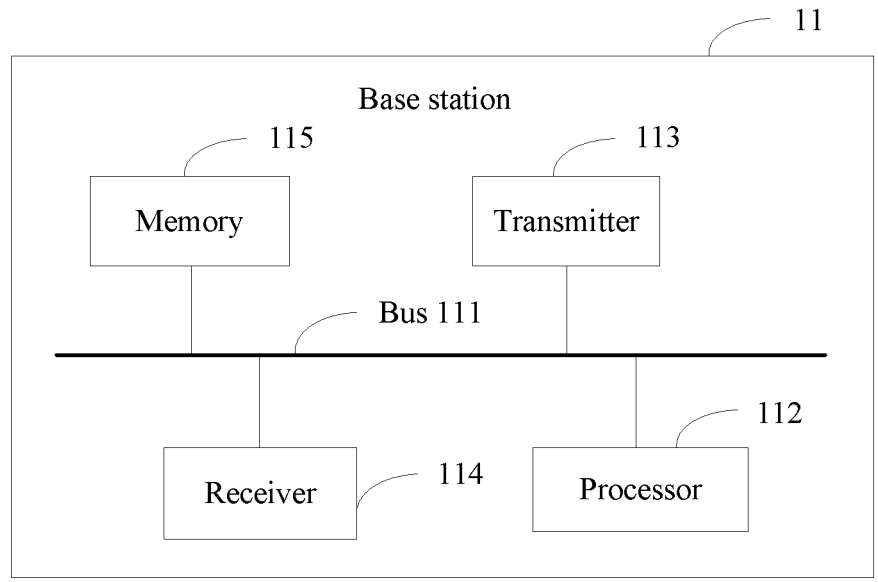
FIG. 11 is a schematic structural diagram of composition of another base station according to an embodiment of the present invention.

An embodiment of the present invention provides a base station 11. As shown in FIG. 11, the base station 11 includes a bus 111, and a processor 112, a transmitter 113, a receiver 114, and a memory 115 that are connected to the bus 111. The memory 115 is configured to store an instruction and data. The receiver 114 executes the instruction to receive, in a process of performing congestion control or overload control, a radio resource control RRC connection request sent by user equipment UE, where the RRC connection request includes a service type indication of a service initiated by the UE, and the service type indication is used to indicate any one of a voice service, a video service, or a short message service. The processor 112 executes the instruction to determine, according to the service type indication, to establish an RRC connection for the UE. The transmitter 113 executes the instruction to send an RRC connection setup message to the UE.

In this embodiment of the present invention, optionally, the transmitter 113 executes the instruction to send a connection setup request to a mobility management network element, where the connection setup request includes the service type indication, so that in a process of performing congestion control or overload control, if the mobility management network element receives a non-access stratum NAS request message that is sent by the UE and that includes the service type indication, the mobility management network element determines to send an accept message corresponding to the NAS request message to the UE.

The connection setup request is an initial UE message, an uplink non-access stratum NAS transport message, a direct transfer message, or the like.

In this embodiment of the present invention, optionally, the processor 112 executes the instruction to perform, according to the service type indication, statistics collection and classification on types of services initiated by the UE.

In this embodiment of the present invention, optionally, the transmitter 113 executes the instruction to: when the service that is initiated by the UE and that is corresponding to the service type indication is handed over, send the service type indication and an identifier of the UE to a target base station to which the service is handed over.

This embodiment of the present invention provides a base station. In a process of performing congestion control or overload control, the base station receives a radio resource control RRC connection request sent by UE, where the RRC connection request includes a service type indication of a service initiated by the UE, and the service type indication is used to indicate any one of a voice service, a video service, or a short message service. The base station may determine, according to the service type indication, that the service initiated by the UE is a voice service, a video service, or a short message service, and send an RRC connection setup message to the UE, that is, accept the RRC connection request, so that the UE completes an access stratum signaling connection to the base station. Similarly, the UE may add the service type indication to a NAS request message and send the NAS request message to a mobility management network element. In this way, when performing congestion control or overload control, the mobility management network element may determine, according to the service type indication, to accept the NAS request, so as to complete a non-access stratum connection to the UE and ensure that an IMS service of the UE is successfully performed, thereby resolving a prior-art problem that a service, such as a voice service, a video service, or a short message service of user equipment fails to be established because a network side performs congestion control or overload control.

Figure 12:
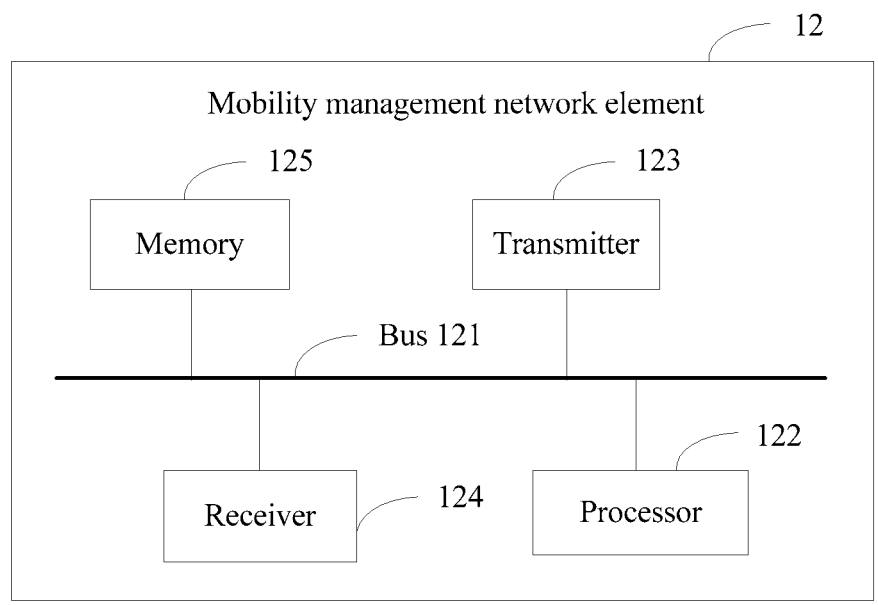
FIG. 12 is a schematic structural diagram of composition of another mobility management network element according to an embodiment of the present invention.

An embodiment of the present invention provides a mobility management network element 12. As shown in FIG. 12, the mobility management network element 12 includes a bus 121, and a processor 122, a transmitter 123, a receiver 124, and a memory 125 that are connected to the bus 121. The memory 125 is configured to store an instruction and data. The receiver 124 executes the instruction to receive a connection setup request sent by a base station, where the connection setup request includes a service type indication, the service type indication is used to indicate any one of a voice service, a video service, or a short message service, and the connection setup request is any one of an initial UE message, an uplink non-access stratum NAS transport message, or a direct transfer message. The receiver 124 executes the instruction to further receive, in a process of performing congestion control or overload control, a non-access stratum NAS request sent by the UE. The transmitter 123 executes the instruction to: if the non-access stratum NAS request includes the service type indication, send an accept message corresponding to the NAS request to the UE.

With reference to an entity structure of the mobility management network element, in another possible implementation, the receiver 124 executes the instruction to receive, in a process of performing congestion control or overload control, a non-access stratum NAS request sent by user equipment UE, where the NAS request includes a service type indication of a service initiated by the UE, and the service type indication is used to indicate any one of a voice service, a video service, or a short message service. The processor 122 executes the instruction to determine, according to the service type indication, to accept the NAS request. The transmitter 123 executes the instruction to send an accept message corresponding to the NAS request to the UE.

In this embodiment of the present invention, optionally, the NAS request is a location update request, a service request, or an extended service request.

In this embodiment of the present invention, optionally, the processor 122 executes the instruction to perform, according to the service type indication, statistics collection and classification on types of services initiated by the UE.

In this embodiment of the present invention, optionally, the transmitter 123 executes the instruction to send the service type indication and an identifier of the UE to another core network element. The another core network element is a mobility management network element MME, an SGSN, a serving gateway, a packet data network PDN, a gateway, or the like.

This embodiment of the present invention provides a mobility management network element. After UE completes establishment of an access stratum signaling connection to a base station, in a process of performing congestion control or overload control, the mobility management network element receives a NAS request sent by the UE, where the NAS request includes a service type indication of a service initiated by the UE, and the service type indication is used to indicate any one of a voice service, a video service, or a short message service. The mobility management network element may determine, according to the service type indication, that the service initiated by the UE is a voice service, a video service, or a short message service, and send an accept message corresponding to the NAS request to the UE, that is, accept the NAS request message, to complete establishment of a non-access stratum connection to the UE, thereby ensuring that an IMS service initiated by the UE is successfully performed. Similarly, when a connection between the base station and the mobility management network element is established, a connection request sent by the base station includes the service type indication. When the mobility management network element performs congestion control or overload control, the mobility management network element may accept, according to the service type indication, the NAS request message that is sent by the UE and that includes the service type indication, to complete establishment of the non-access stratum connection to the UE and ensure that the IMS service initiated by the UE is successfully performed, thereby resolving a prior-art problem that a service, such as a voice service, a video service, or a short message service of user equipment fails to be established because a network side performs congestion control or overload control.

Figure 13:
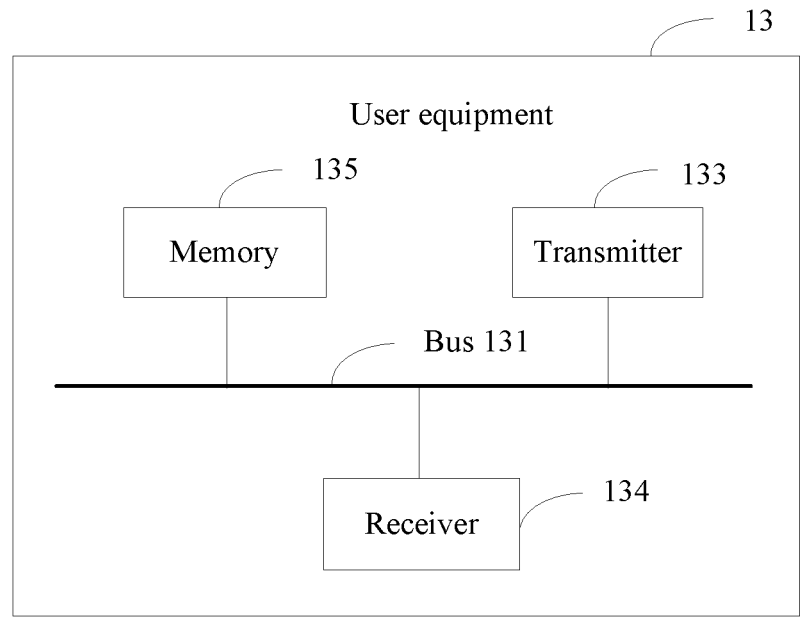
FIG. 13 is a schematic structural diagram of composition of another user equipment according to an embodiment of the present invention.

An embodiment of the present invention provides user equipment 13. As shown in FIG. 13, the user equipment 13 includes a bus 131, and a transmitter 133, a receiver 134, and a memory 135 that are connected to the bus 131. The memory 135 is configured to store an instruction and data. The transmitter 133 executes the instruction to send a radio resource control RRC connection request to a base station, where the RRC connection request includes a service type indication of a service initiated by the UE, and the service type indication is used to indicate any one of a voice service, a video service, or a short message service. The receiver 134 executes the instruction to receive an RRC connection setup message sent by the base station, where the RRC connection setup message is sent by the base station according to the service type indication when the base station performs congestion control or overload control.

With reference to an entity structure of the user equipment, in another possible implementation, the transmitter 133 executes the instruction to send a non-access stratum NAS request message to a mobility management network element, where the NAS request message includes a service type indication, and the service type indication is used to indicate any one of a voice service, a video service, or a short message service. The receiver 134 executes the instruction to receive an accept message that is corresponding to the NAS request message and that is sent by the mobility management network element, where the accept message is sent by the mobility management network element according to the service type indication when the mobility management network element performs congestion control or overload control.

This embodiment of the present invention provides user equipment UE. The UE sends a radio resource control RRC connection request to a base station, where the RRC connection request includes a service type indication of a service initiated by the UE, and the service type indication is used to indicate any one of a voice service, a video service, or a short message service. When congestion control or overload control is performed on a base station side, the UE receives an RRC connection setup message sent by the base station, to complete a three-way handshake with the base station. Similarly, the UE sends a non-access stratum NAS request message to a mobility management network element when accessing a core network, where the NAS request message may also include the service type indication. The mobility management network element accepts the NAS request message if the mobility management network element performs congestion control or overload control, so that the UE successfully accesses the core network and an IMS service is successfully performed, thereby resolving a prior-art problem that a service, such as a voice service, a video service, or a short message service of user equipment fails to be established because a network side performs congestion control or overload control.

Figure 14:
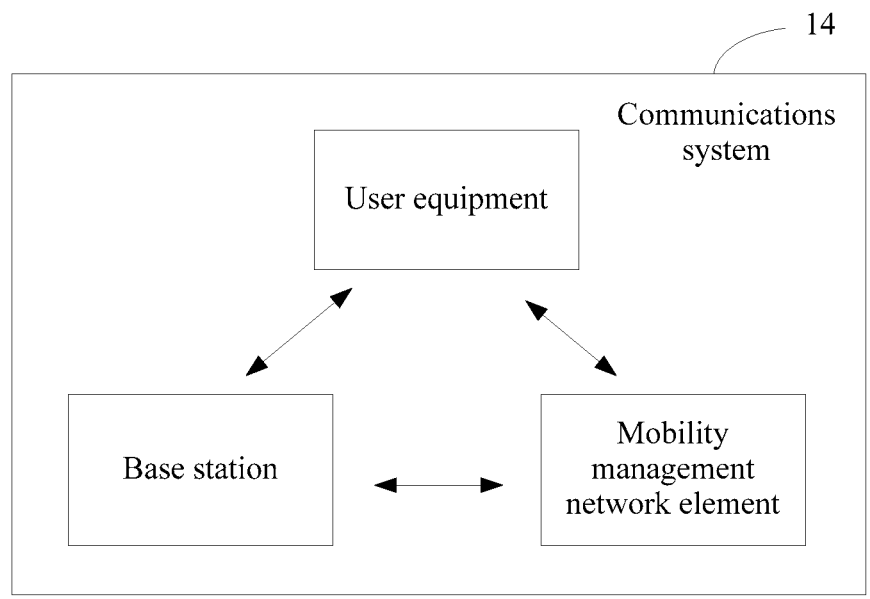
FIG. 14 is a schematic diagram of a communications system according to an embodiment of the present invention.

An embodiment of the present invention further provides a communications system 14. As shown in FIG. 14, the communications system 14 includes the UE, the base station, and the mobility management network element that are described in the foregoing embodiments. For a respective specific implementation, refer to the foregoing embodiment. This is not specifically limited herein.

In the several embodiments provided in this application, it should be understood that the disclosed system, related apparatus, and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

In addition, functional units in the devices and systems in the embodiments of the present invention may be integrated into one processing unit, or each of the units may exist alone physically, or two or more units are integrated into one unit. The units may be implemented in a form of hardware, or may be implemented in a form of hardware in addition to a software functional unit.

All or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a USB flash drive, a removable hard disk, a read-only memory (ROM for short), a random access memory (RAM for short), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A base station, comprising:
   a receiver;
   a transmitter;
   a processing hardware; and
   a non-transitory computer readable medium including computer-executable instructions that, when executed by the processing hardware, facilitate performing a service processing method comprising:
   receiving, by the receiver cooperating with the processing hardware when a congestion control or an overload control is being performed, a radio resource control (RRC) connection request from a user equipment (UE), wherein the RRC connection request comprises a service type indication of a service initiated by the UE, and the service type indication indicates a service type taken from the group consisting of: a voice service, a video service, and a short message service;
   determining, according to the service type indication, to establish an RRC connection for the UE;
   sending, by the transmitter cooperating with the processing hardware, an RRC connection setup message to the UE; and
   sending, by the transmitter cooperating with the processing hardware, a connection setup request to a mobility management network element,
   wherein the connection setup request comprises the service type indication, so that in a process performing the congestion control or the overload control, if the mobility management network element receives from the UE a non-access stratum (NAS) request that comprises the service type indication, the mobility management network element is able to send an accept message corresponding to the NAS request to the UE, and
   wherein the connection setup request is a message type taken from the group consisting of: an initial UE message, an uplink NAS transport message, and a direct transfer message.

2. The base station according to claim 1, wherein the method further comprises performing, according to the service type indication, a statistics collection and a classification on types of services initiated by the UE.

3. The base station according to claim 1, wherein the method further comprises:
   sending, by the transmitter cooperating with the processing hardware when the service initiated by the UE is to be handed over, the service type indication and an identifier of the UE to a target base station to which the service initiated by the UE is handed over.

4. A mobility management network element that comprises:
   a receiver;
   a transmitter;
   a processing hardware; and
   a non-transitory computer readable medium including computer-executable instructions that, when executed by the processing hardware, facilitate performing a service processing method comprising:
   receiving, by the receiver cooperating with the processing hardware, a connection set up request from a base station, wherein the connection setup request comprises a service type indication, wherein the service type indication indicates a service type taken from the group consisting of: a voice service, a video service, and a short message service, and wherein the connection setup request is a message type taken from the group consisting of: an initial UE message, an uplink non-access stratum (NAS) transport message, and a direct transfer message;
   receiving, by the receiver cooperating with the processing hardware when a congestion control or an overload control is being performed, a non-access stratum (NAS) request from a user equipment (UE); and
   sending, by the transmitter cooperating with the processing hardware when the NAS request comprises the service type indication, an accept message corresponding to the NAS request to the UE.

5. The mobility management network element according to claim 4, wherein the method further comprises performing, according to the service type indication, a statistics collection and a classification on types of services initiated by the UE.

6. The mobility management network element according to claim 4, wherein the method further comprises:
   sending, by the transmitter cooperating with the processing hardware, the service type indication and an identifier of the UE to another core network element.

7. A service processing method performed on a base station, the method comprising:
   receiving, when a congestion control or an overload control is being performed, a radio resource control (RRC) connection request from a user equipment (UE), wherein the RRC connection request comprises a service type indication of a service initiated by the UE, and the service type indication indicates a service type taken from the group consisting of: a voice service, a video service, and a short message service;

determining, according to the service type indication, to establish an RRC connection for the UE;

sending an RRC connection setup message to the UE; and sending a connection setup request to a mobility management network element, wherein the connection setup request comprises the service type indication, so that in a process performing the congestion control or the overload control, if the mobility management network element receives from the UE a non-access stratum (NAS) request that comprises the service type indication, the mobility management network element is able to send an accept message corresponding to the NAS request to the UE, and wherein the connection setup request is a message type taken from the group consisting of: an initial UE message, an uplink NAS transport message, and a direct transfer message.

8. The method of claim 7, wherein the method further comprises performing, according to the service type indication, a statistics collection and a classification on types of services initiated by the UE.

9. The method of claim 7, wherein the method further comprises:

sending, when the service initiated by the UE is to be handed over, the service type indication and an identifier of the UE to a target base station to which the service initiated by the UE is handed over.

* * * * *